United States Patent [19]
O'Brien

[11] Patent Number: 5,810,453
[45] Date of Patent: Sep. 22, 1998

[54] BICYCLE WHEELS HAVING HUB TIGHTENED SPOKE SYSTEM

[76] Inventor: Colin O'Brien, 2304 La Follette, Madison, Wis. 53704

[21] Appl. No.: 677,172

[22] Filed: Jul. 9, 1996

Related U.S. Application Data

[63] Continuation-in-part of Ser. No. 287,727, Aug. 9, 1994, abandoned.

[51] Int. Cl.⁶ .................................................. B60B 27/00
[52] U.S. Cl. ........................................... 301/59; 301/110.5
[58] Field of Search .................................. 301/55, 56, 59, 301/61, 110.5, 110.6; 192/64

[56] References Cited

U.S. PATENT DOCUMENTS

| | | | |
|---|---|---|---|
| 450,484 | 4/1891 | Duval | 301/55 |
| 1,313,646 | 8/1919 | Sloper | 301/105.1 |
| 1,388,021 | 8/1921 | Budd | 301/59 |
| 1,393,441 | 10/1921 | Heales | 301/55 X |

FOREIGN PATENT DOCUMENTS

| | | | |
|---|---|---|---|
| 64275 | 2/1946 | Denmark | 301/110.5 |
| 681713 | 5/1930 | France | 301/59 |
| 1016133 | 11/1952 | France | 301/59 |
| 923641 | 12/1954 | Germany | 301/59 |
| 160701 | 6/1989 | Japan | 301/55 |
| 223188 | 11/1942 | Switzerland | 301/105.1 |
| 12467 | of 1885 | United Kingdom | 301/55 |
| 11906 | of 1890 | United Kingdom | 301/55 |
| 23332 | of 1901 | United Kingdom | 301/55 |
| 6908 | of 1903 | United Kingdom | 301/55 |
| 645374 | 11/1950 | United Kingdom | 301/59 |

*Primary Examiner*—Russell D. Stormer
*Attorney, Agent, or Firm*—Felfe & Lynch

[57] ABSTRACT

A bicycle is provided with wheels wherein the spokes extend from nailheads secured in the rim of the wheel inwardly to an annular flange at the hub. Radially inwardly of the annular flange of the hub, a threaded nipple receives a threaded end of the spoke, allowing for adjustment of the tension in the spoke. The size of the holes in the rim of the spokes is reduced and enhances the strength of the rim. The spokes extend straight, without bends, and are therefore able to bear more tension, and the number of spokes may consequently be reduced.

21 Claims, 8 Drawing Sheets

BICYCLE WHEELS HAVING HUB TIGHTENED SPOKE SYSTEM

This application is a continuation-in-part of application Ser. No. 08/287,727 filed Aug. 9, 1994, now abandoned.

FIELD OF THE INVENTION

This invention relates to bicycles, and more particularly, to spoke systems for the wheels of bicycles.

DESCRIPTION OF THE PRIOR ART

It is well known to provide a bicycle wheel in the form of a hub connected to a rim by a number of spokes. The usual arrangement for these spokes is that the hub has a circular flange with a number of holes therein. Each of the spokes has a nailhead that secures it in the hub flange. From the nailhead, each spoke extends horizontally through the associated hole in the flange, and then bends to extend obliquely outwardly to the rim. At the rim, each spoke has a threaded end which threads into an enlarged threaded nipple structure which is supported in a hole in the rim and secures the spoke to the rim.

Such a structure has a number of drawbacks. First, the nipple is necessarily larger than the spoke because it must have a threaded engagement with the threaded end of the spoke. As a result, the hole in the rim for the nipple must be substantially larger than the diameter of the spoke. The size of these holes weakens the structural strength of the rim.

Secondly, the bend in the spoke where it passes through the hub flange is a point of particular weakness. When spokes fail in such a wheel, the normal location of the failure is where the spoke bends at the central flange.

Thirdly, the presence of the nipples at the rim on the perimeter of the wheel increases the angular inertia of the wheel and its resistance to acceleration. This may be significant in conditions such as bicycle races wherein small differences in the force needed to accelerate the bicycle can be critical.

SUMMARY OF THE INVENTION

Wheels for a bicycle are provided which have a rim and a hub and spokes connecting the two. Each spoke has a nailhead at its radially outer end which secures it in a hole in the rim. The spoke extends radially inward from the rim to pass through a hole in an annular flange on the hub. The radially inward end of the spoke is threaded and extends through the hub flange to threadedly engage a nipple, or hexagonal nut.

The spoke extends substantially straight from its nailhead end to the hexagonal nut, eliminating the bend which weakened spokes in the prior art. The presence of the nipple at the hub also reduces the angular inertia of the entire wheel. In addition, the fact that the spoke itself extends through the hole in the rim without the need for a nipple allows the hole in the rim to be quite small, adding to the structural integrity of the rim. Because the rim and spokes are stronger, the spokes may be subjected to greater tension and the numbers thereof reduced. This in turn reduces the number of holes in the rim, which again increases the structural integrity of the entire wheel assembly.

In the preferred embodiment, the front wheel hub of the bicycle has two substantially identical annular flanges staggered to allow spokes from both flanges to attach to the rim. The rear wheel, however, has a drive sprocket on one side of its hub structure which transmits torque to cause the wheel to turn. The transmission of this torque requires a special spoke arrangement and hub flange on the side of the back wheel hub which bears the sprocket.

Other benefits and objectives of the invention shall become evident in the specification herein, and the scope of the invention will be asserted in the claims.

DETAILED DESCRIPTION OF THE INVENTION

Figure 1:
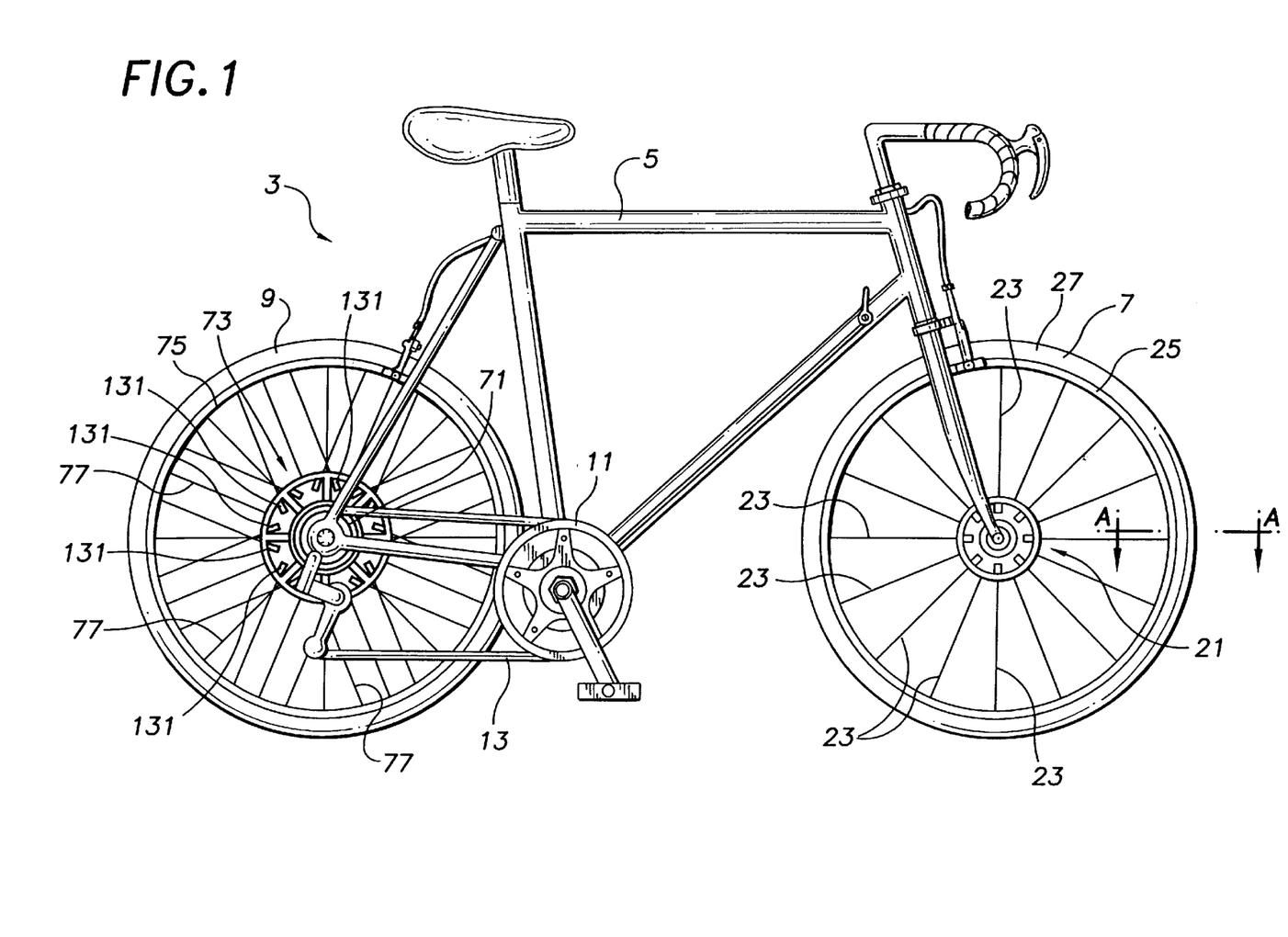
FIG. 1 shows an elevational view of a bicycle having wheels of the invention herein.

Referring to FIG. 1, a bicycle, generally indicated at 3, comprises a frame 5 supported on two wheels, a front wheel 7 and a rear wheel 9. A pedal crank system 11 is connected by a chain 13 to the rear wheel 9.

Figure 2:
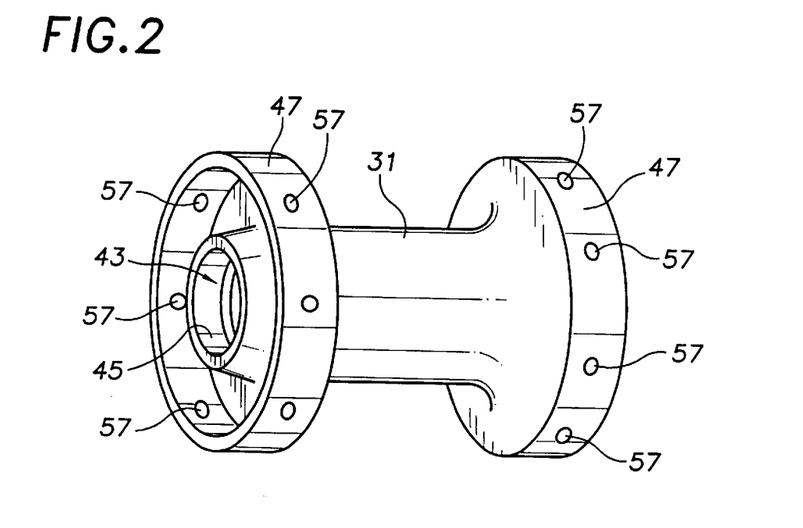
FIG. 2 is a perspective view of the outer hub structure of a front bicycle wheel of the invention.
Figure 3:
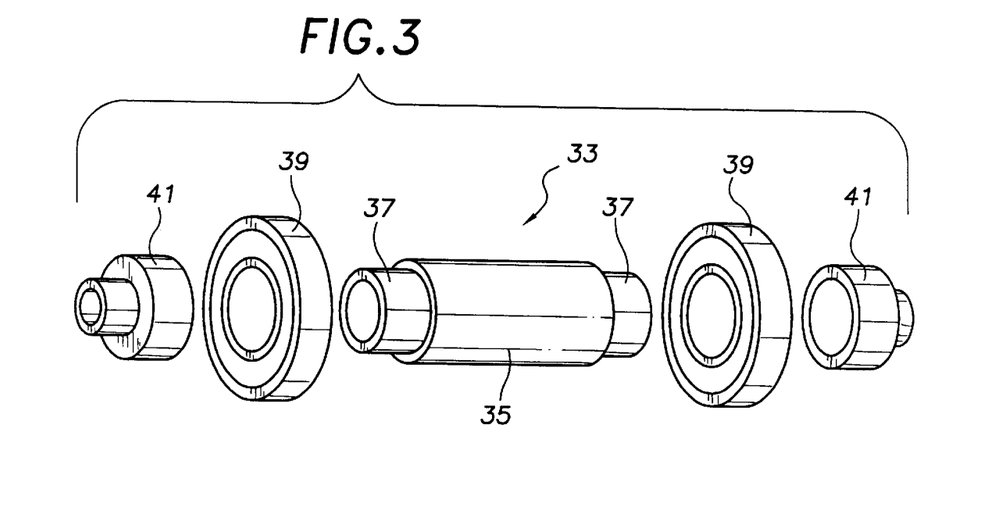
FIG. 3 is an exploded perspective view of the axle structure which is inserted into the hub structure of FIG. 4.
Figure 4:
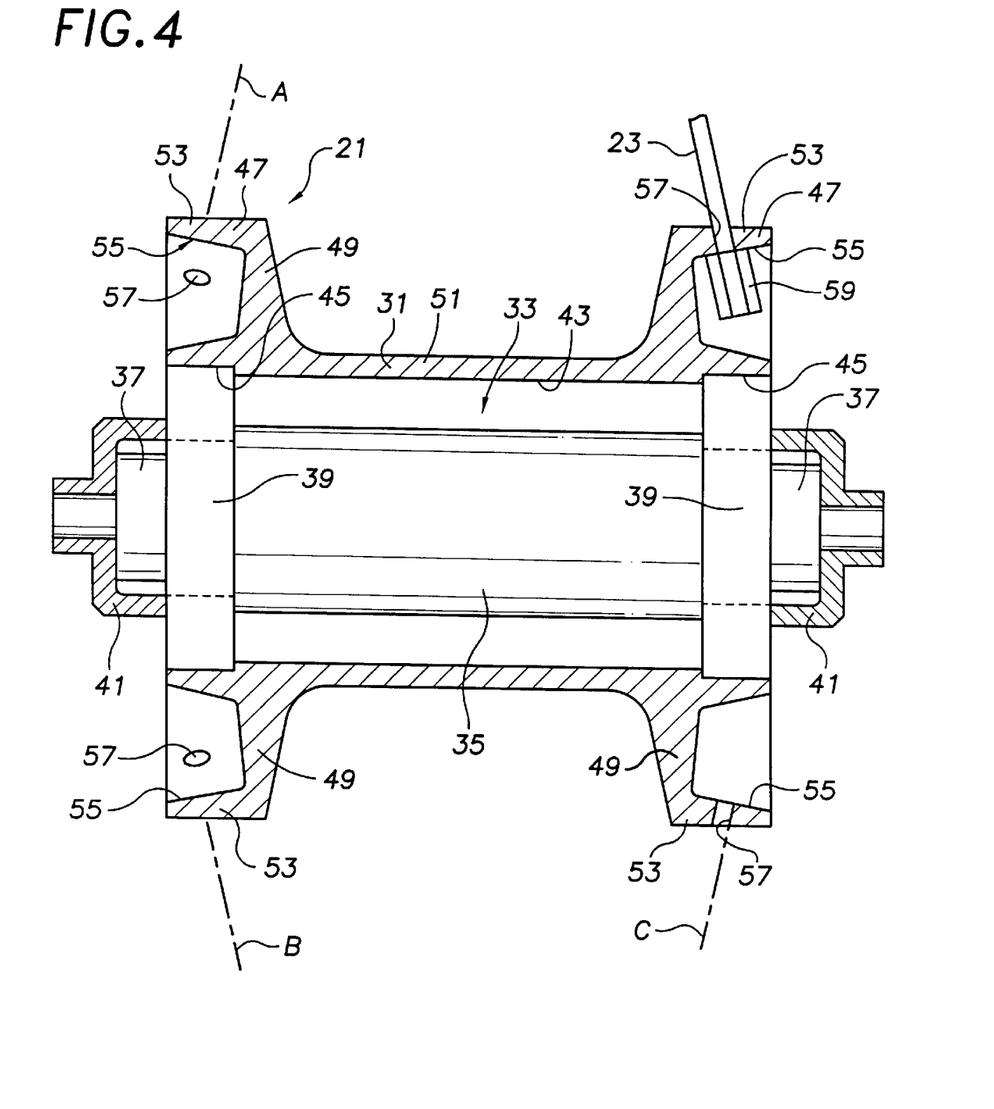
FIG. 4 shows a cross-sectional cut-away of a hub for a front wheel taken through a plane passing through the rotational axis of the front wheel.

Front wheel 7 comprises a hub structure generally indicated at 21 from which a plurality of spokes 23 extend radially to engage a rim 25 on which is secured an inflatable tire 27. Referring to FIGS. 2, 3 and 4, the front wheel hub structure 21 comprises a hub shell structure 31 which is rotatably supported on an axle structure generally indicated at 33. The axle structure 33 is comprised of an axle 35 having two opposing ends 37 which extend through industrial cartridge sealed bearing structures 39. The ends 37 are covered by caps 41. As best shown in FIG. 4, the axle structure 33 extends through the central cylindrical space 43 in hub shell structure 31. The bearing structures 39 are each accommodated in a bearing seat recess 45 in the hub shell structure 31.

As best shown in FIGS. 2 and 4, the hub shell structure 31 is provided with two spoke attachment flange structures 47. These flange structures 47 have a first portion 49 which extends radially outwardly from the cylindrical inner portion 51 of the hub shell structure. From the radially outward ends of the first portions 49, generally cylindrical annular flanges 53 extend laterally outwardly of the hub structure 21. Each annular flange 53 provides an radially inwardly conical shaped surface portion 55 which angles radially outward and axially outwardly of the hub shell structure 31.

The annular flange 53 has a plurality of spoke openings or holes 57 therein. In the preferred embodiment, there are eight such openings 57 in each annular flange 55. A spoke 23 extends through each of the openings 57. Each spoke 23 engages a nipple or adjustable securing means 59 at its radially inward end. In the preferred embodiment, this spoke securing means 59 is a hexagonal nut which is threaded to receive the threaded radially inward end of the spoke 23. Adjustment of the spoke tension can be accomplished by rotating the hexagonal nut to tighten or loosen the spoke 23. The spoke openings 57 are configured so that the spoke 23 extends therethrough at right angles to the angled conical surface portion 55 of the annular flange 53. The hexagonal nut consequently engages the angled conical surface 55 with a square abutment which secures the spoke 23 in the opening 57.

It will be understood by one skilled in the art that, while for clarity's sake one spoke 23 is shown in FIG. 4, there are a number of spokes 23 in each flange 53. Each spoke 23 extends radially directly outward from the hub, in the sense that each spoke 23 extends in a plane in which the axis of revolution of the wheel extends. Each spoke 23 is supported in its respective opening 57 to angulate axially inward of the hub structure 31 within that plane, as seen in FIG. 4. It will be understood that the spokes 23 on the other flange will be angulated inwardly from the other end of the hub structure 31 in a substantially symmetrical angle (see lines A, B, and C in FIG. 4) so that the two sets of spokes 23 will engage and hold the rim in a plane perpendicular to the axis of the wheel at approximately the lateral midpoint between the flanges 53.

As best shown in FIG. 2, the openings 57 in the annular flanges 53 are staggered relative to the openings on the opposite flange 53 of the front wheel 7, allowing the spokes from the opposing flanges 53 to alternate in the connection about the circumference of the wheel. This allows for the spokes to extend directly radially outward from the hub to the rim. In the preferred embodiment for a front wheel, there are sixteen spokes, eight on each flange 53, and the spokes on one flange are angularly staggered at 22½° relative rotation to the spokes on the other flange 53.

Figure 5:
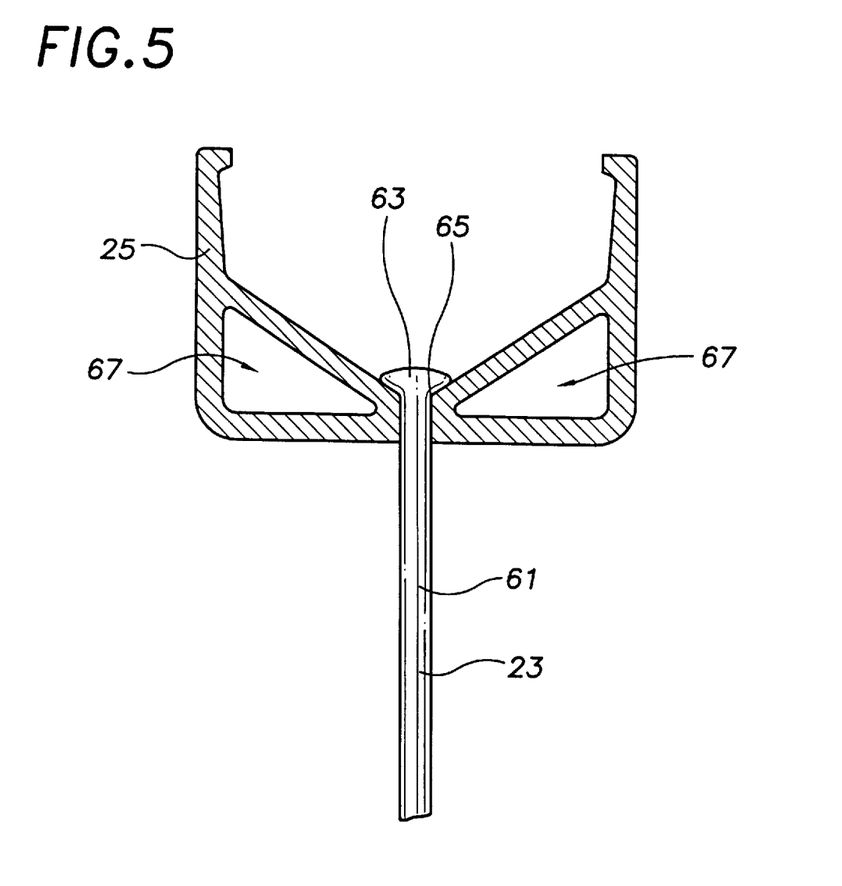
FIG. 5 is a sectional view along line A—A of FIG. 1.

FIG. 5 shows the connection of a spoke 23 to a portion of the rim 25. The spoke is essentially formed of a shaft 61 formed integral with a nailhead end 63. The shaft 61 typically has a diameter of two millimeters. The nailhead end 63 is somewhat larger than this to secure the spoke 23 in an aperture 65 approximately two millimeters in diameter in the rim 25. Due to the fact that no nipple at the rim is required in the present invention, the aperture 65 may be as narrow as two millimeters, substantially smaller than in the prior art.

Figure 9:
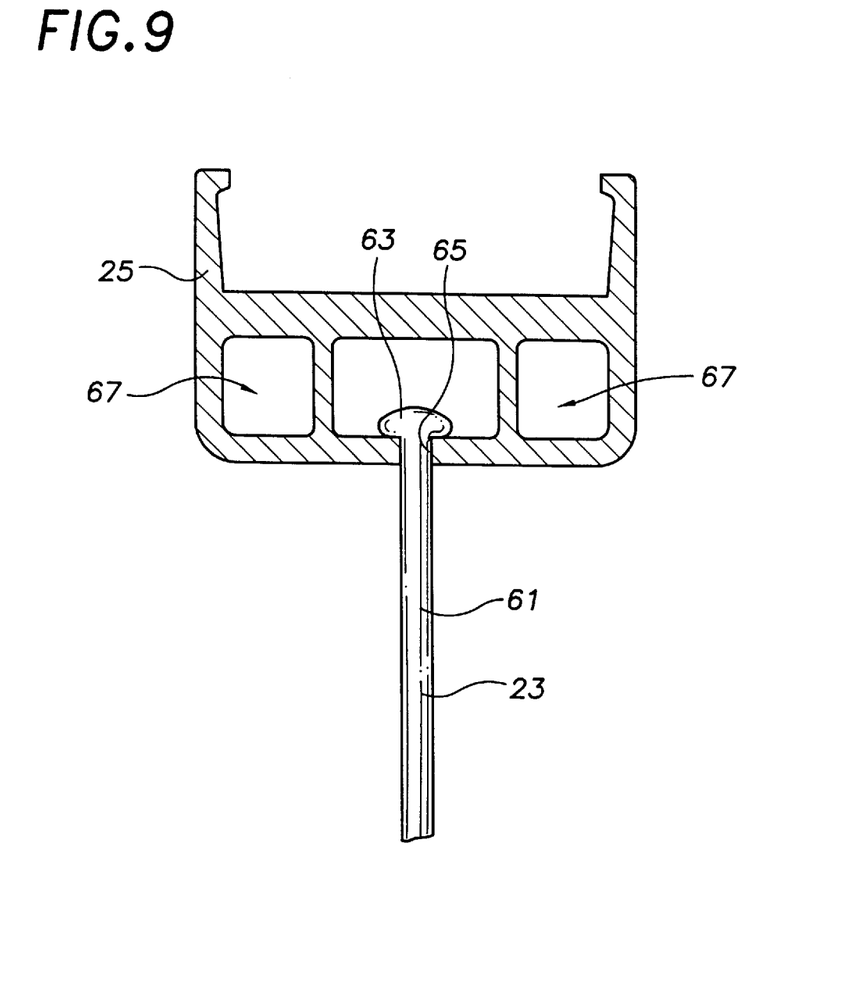
FIG. 9. shows an alternate embodiment of the invention in a view similar to that in FIG. 5.

The rim of the preferred embodiment shown in FIG. 5 is the Bontrager BCX 1 rim, available from Weinmann Inc., 3 Union Drive, Olney, Ill. 62450, which has tubular rim reinforcing structures, generally indicated at 67, which add to the structural strength of the rim. An alternate embodiment shown in FIG. 9 makes use of another rim, also manufactured by Weinmann Inc., and sold as the Bontrager Red rim. The rims of the preferred embodiment are the industry standard "26-inch" rim, which is actually not 26 inches, but of standard dimensions well known in the bicycle industry. Wheels of other sizes may also readily use the spoke system of the invention, however. The lateral width of the rim may also vary widely, but is most preferably in the range of 1.5 to 2.3 inches. It will be understood that while this specific rim is shown in the preferred embodiment, any other type of rim would benefit from the application of the hub-adjusted spoke system of the invention.

Rear wheel 9 is equipped with thirty-two (32) spokes, as opposed to the sixteen (16) spokes which are provided for the front wheel 7. The reason for this is that the rear wheel 9 is driven by a sprocket, and there is therefore additional torque transmitted through the spokes to the rim, requiring additional reinforcement.

The rear wheel is provided with a sprocket 71 which is driven by chain 13. The sprocket 71 is connected with the hub structure 73 of the rear wheel by various conventional means well known in the art. The hub 73 is connected to the rear wheel rim 75 by a plurality of spokes 77.

Figure 6:
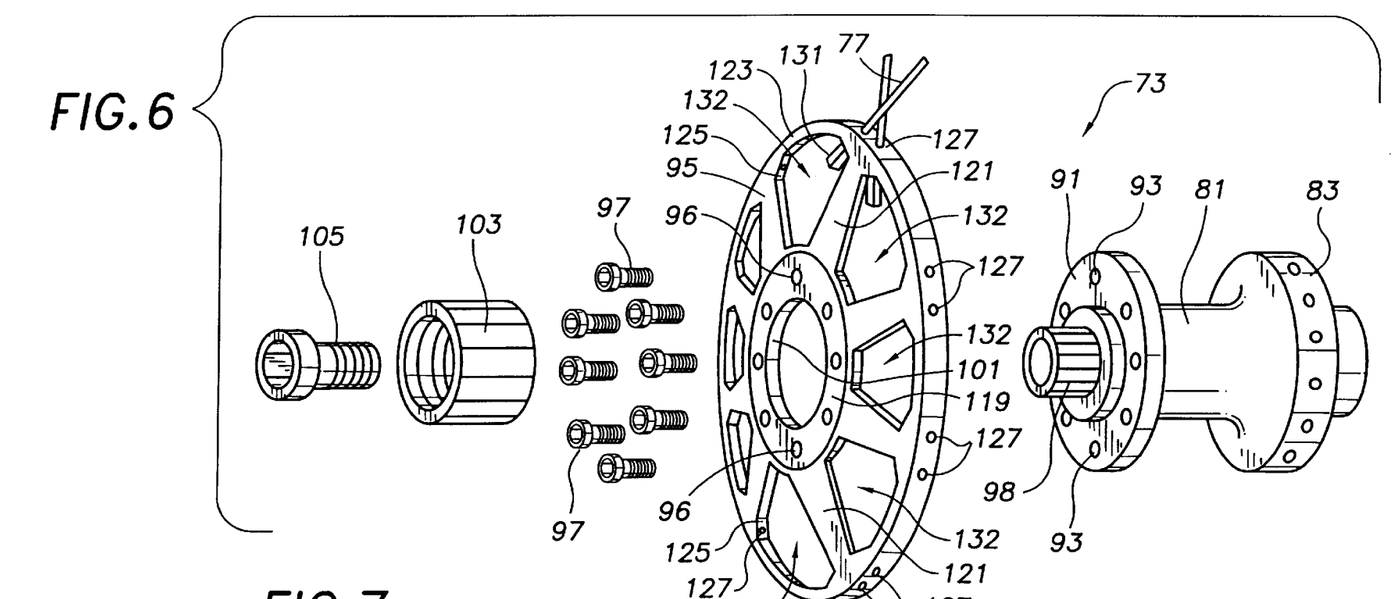
FIG. 6 is an exploded perspective view of the sprocket-side hub structure for a rear bicycle wheel of the invention.

Hub structure 73 is shown in exploded form in FIG. 6, and in a cross-sectional view taken from the axis of rotation of the rear wheel 9.

With reference to FIG. 6, a hub structure 81 is provided. The end of the hub structure 81 is provided with an annular flange portion 83. Annular flange 83 is provided with a conical inward surface 85, and has sixteen (16) spoke apertures or holes 87 therein through which spokes 77 extend to secure this end of the hub structure 81 to the rim 75. These spokes 77 are adjustably secured by nipples or hexagonal nuts, which abut the conical surface portion 85 of annular flange 83 in a manner similar to the abutment and securement of the spokes 23 with nipples 59 in front wheel hub structure 21. Each spoke 77 connected with the flange 83 extends radially directly outward from the hub 73, in a plane passing through the axis of rotation of the wheel 9, as do the spokes 23 of front wheel 7. The angular slope of the apertures 87 causes the spokes 77 therein to angle axially inwardly of the hub within this plane to engage the rim in a plane perpendicular to the axis of rotation and which is axially intermediate the ends of the hub structure 73.

Figure 7:
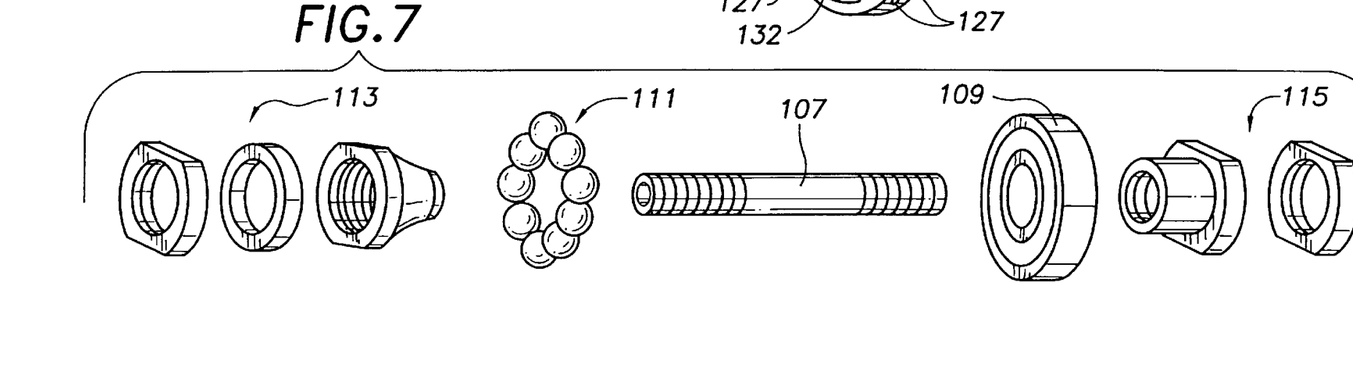
FIG. 7 is an exploded view of the axle and bearing structure inserted into the hub structure of FIG. 5.

The assembly of the rear hub 73 is shown in FIGS. 6 and 7. The end of the hub structure 81 adjacent the sprocket 71 is provided with a circular flange 91 in which are a plurality of threaded securement openings 93. Hub flange 95 is secured in engagement with circular flange 91 by a plurality of bolts 97 which extend through openings 99 in hub flange 95 and thread into openings 93 in flange 91. Spline protrusion 98 extends through the central aperture 101 in flange 95 and engages cassette body 103 on which the sprocket assembly 71 is mounted. This engagement is secured by securing member 105 which threads into spline protrusion 98. Axle 107 extends through a cylindrical space extending through the entire hub 73. Sealed industrial bearing 109 and ball bearings 111 provide for rotation of the hub structure around the axle 107. Securement means, indicated generally at 113 and 115, secure the axle within the hub structure 73.

Figure 8:
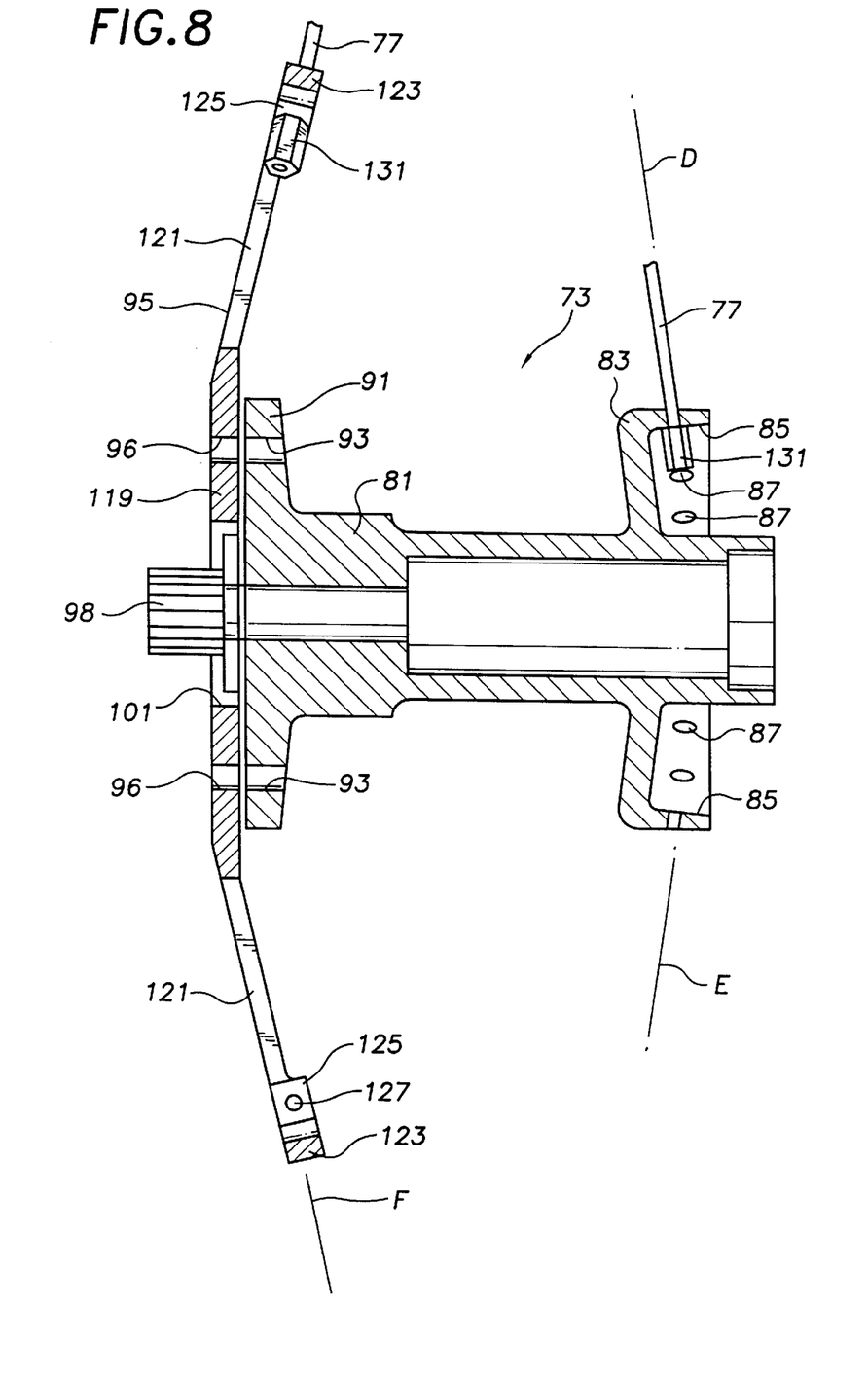
FIG. 8 is a section view taken through the rotational centerline of hub structure of FIG. 6.
Figure 8A:
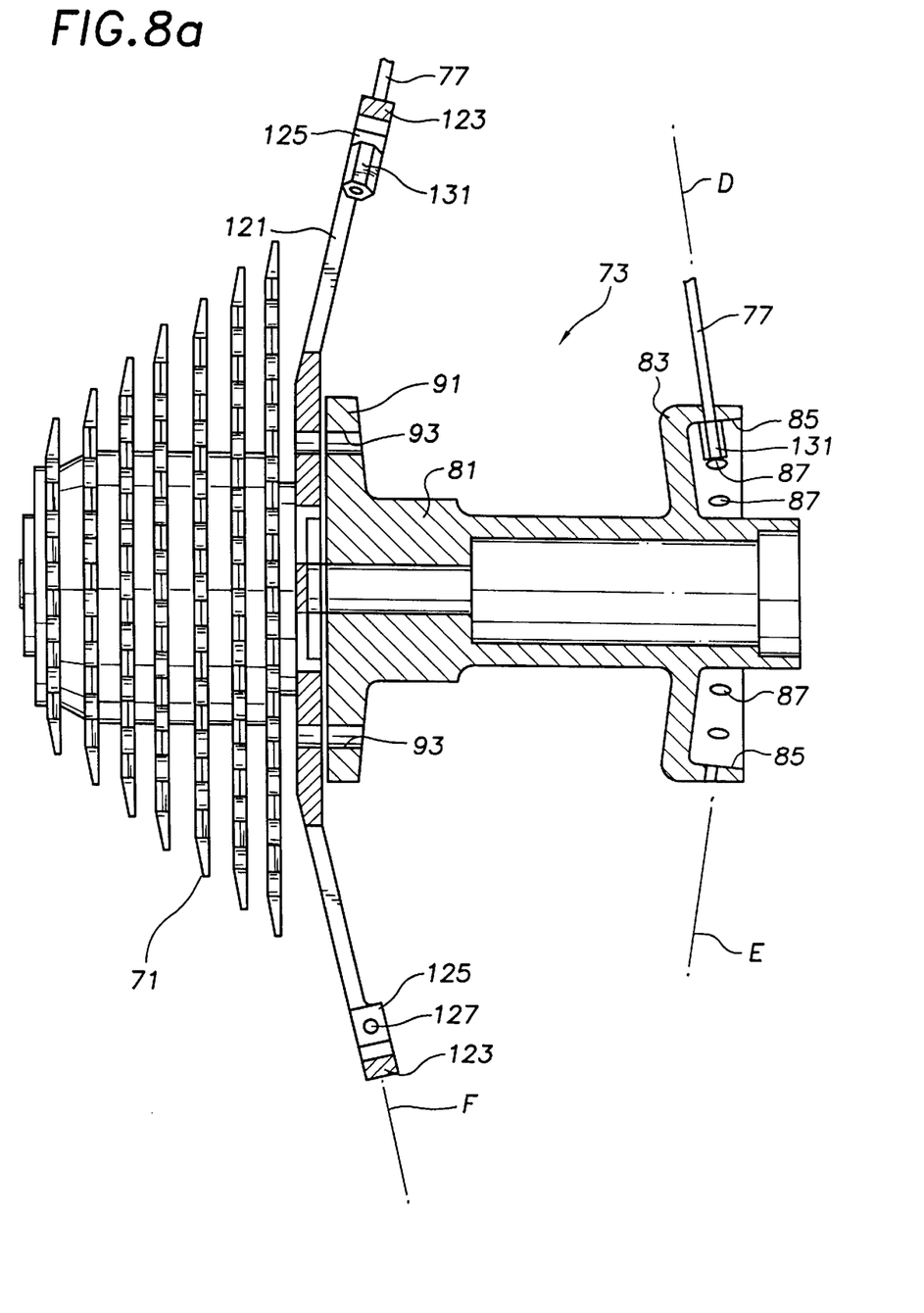
FIG. 8a is the identical view as in FIG. 8, showing the sprocket structure as well.

The structure of the hub flange 95 is best shown in FIGS. 6, 8, and 8*a*. Hub flange 95 comprises a central annular portion 119 from which extend flange legs 121. Flange legs 121 are angled back axially inwardly of the hub at an angle of approximately 5.6°, to give the flange 95 a conic shape. This angle renders the structure of flange 95 more efficient, as the legs 121 extend substantially directly towards the rim 75 for transmitting loads between the rim 75 and the hub axle 107.

The radially outward ends of legs 121 are formed integral with an annular outward ring 123 of the hub flange 95. This ring 123 includes a plurality of angled flat portions 125. These angled flat portions have openings 127 therein through which the spokes 77 of the back wheel 9 are placed. The spokes 77 are then secured by hexagonal adjustment nuts or nipples 131 which are threaded onto the threaded radially inward ends of spokes 77.

The apertures 127 for the spokes extend in the same cone as that defined by the legs 121 of hub flange 95. However, the apertures 127 are angled relative to the nearest leg 121 so that the spokes 77 extending therethrough cross the radial centerline of the nearest leg 121 at an angle of about 18°. For each leg there are two flat portions 125, and two opposingly angled spokes 77. These spokes criss-cross radially outward from ring 123 in an abutting engagement which gives a webbing reinforcement to the wheel 9. The spokes extend to the rim wherein they are secured with the rim in an arrangement similar to that shown in FIG. 5.

The hex adjustment nuts 131 engage the flat surfaces 125 in a right angle perpendicular engagement, i.e., the flat surface portion 125 is perpendicular to the direction of the spoke passing through the associated aperture 127. This allows for a substantially straight extension of the spoke from its nailhead to nipple 131, with only a slight bend near the rim 75. It should be noted that in FIGS. 6 and 8, not all spokes 77 are shown in order to show the structure of the device. Similarly, the lower aperture 127 in FIG. 8 is shown without a spoke to disclose the structure, although, in the preferred embodiment, there is a spoke 77 and a nipple 131 extending through aperture 127.

The nipples or nuts 131 are disposed in openings 132 between legs 121. These openings 132 are large enough to provide ready access to nipples 131 to tighten or loosen the spokes 77.

The relative angling of the spoke apertures 127 relative to the radially extending legs 121 results in a set of half of the sprocket-side spokes 77 extending in an angle which is at a swept clockwise angle from a radial line from the axis of rotation, and in the other half of the sprocket-side spokes being swept at a counter clockwise angle. This is apparent from FIG. 1. The combination of clockwise-and counter-clockwise-swept spokes provides an efficient structure for transmission of torque to the rim 75 from the sprocket 71.

The materials used for manufacture of this spoke system may vary. In the preferred embodiment, the spokes are formed of steel or titanium. The hub shell structures are formed of aluminum alloy, as are the spoke nipples or hex nuts 131 and 59.

The terms used herein should be read as terms of description and not limitation as those skilled in the art will be able with this specification in hand to make modifications therein without departing from the scope of the invention.

Wherefore I claim:

1. A bicycle comprising:
    a frame rollingly supported on first and second wheels;
    a pedal crank driving mechanism including a chain operatively associated with one of the wheels and adapted to permit a rider to impart motion to the bicycle by turning said pedal crank driving mechanism;
    said first wheel comprising
        a hub having first and second laterally spaced annular flanges,
        each of said flanges having a plurality of spoke openings therein;
        a circular rim extending around said hub and having a number of spoke apertures therein, said number of spoke apertures corresponding to the total number of spoke openings in the flanges;
        a number of spoke means, each spoke means extending through a respective spoke aperture in the rim and a respective spoke opening in the first or second flange, each spoke means comprising:
            a head portion radially outwardly of the rim and preventing movement of the spoke means radially inwardly from the rim;
            a shaft portion formed integral with the head portion and extending radially inward therefrom through the respective aperture in the rim, said aperture being dimensioned to approximately the size of a cross-section of said shaft portion;
            the shaft portion having a radially inward end portion including thread means; and
            a nipple threadedly engaging the thread means of the end portion and engaging the respective flange, said nipple preventing movement of the spoke means in a radially outward direction away from the hub, said nipple providing adjustment of the tension in the spoke means responsive to rotation thereof on said thread means;
        said spoke means extending substantially straight from the head portions thereof to the inward end portions thereof;
        said nipples being spaced relative to one another so as to permit rotation of each nipple independent of the other nipples, and
        said rim of said first wheel being supported on said hub solely by said spoke means said first wheel having said spoke means fewer in number and higher in tension than in a conventional bicycle wheel of equal strength having spokes of equal cross-section to the spoke means and an equivalent rim, but with nipple structures held in holes in said rim and screwed onto outer ends of the spokes.

2. The invention according to claim 1 and
    said flanges each comprising a first portion extending generally radially outward of the wheel, and a generally arcuate flange portion connected with said first portion and extending therefrom generally axially outwardly of the hub.

3. The invention according to claim 2 and said end portion of each of the spoke means extending through said respective spoke opening in the associated flange, and said respective nipple engaging the end portion only radially inwardly of the respective spoke opening;
    said first and second flanges each having a radially inward surface engaging the nipple, said surface being at substantially right angles to the shaft portion of the spoke means.

4. The invention according to claim 2 and
    said spoke means extending generally radially outward and axially inward at an angle from the associated flange to the rim, the angle of axially inward extension of the spoke means on the first flange being substantially symmetric to the angle of extension of the spoke means on the second flange.

5. The invention according to claim 4 and
    said flanges each having a generally radially inwardly disposed concave conical nipple engagement surface portion, said surface portion providing an engagement surface at right angles to the shaft portion of the spoke means.

6. The invention according to claim 5 and
    each of said spoke means inward end portions extending radially inwardly of the associated flange and the associated nipple engaging said end portion only radially inwardly of the associated flange.

7. The invention according to claim 6 and
    said spoke means on the first flange being rotatively staggered to intermesh with the spoke means on the second flange.

8. The invention according to claim 7 and
    said rim having generally tubular reinforcement structures extending circumferentially therewith.

9. The invention according to claim 1 and said spoke means associated with said second flange each extending in a respective plane in which the axis of rotation of the wheel lies.

10. The invention according to claim 9 and said first wheel having a sprocket structure thereon adjacent the first flange, and the plurality of spoke means associated with the first flange including a first set of spoke means being angularly swept clockwise of the wheel and a second set of spoke means being swept counterclockwise of the wheel.

11. The invention according to claim 9 and all of said spoke means extending in a respective plane in which the axis of rotation of the wheel lies.

12. The invention according to claim 11 and the cross-sections of the shaft portions and the apertures having a diameter of approximately 2 mm.

13. The invention according to claim 1 and said first wheel further comprising:
   an axle supporting said frame; and
   said hub having first and second bearing structures engaging said axle and providing for rotation of said hub about said axle;
   said first and second bearing structures each being supported on the hub in a respective lateral position to substantially align radially inward with a respective annular flange.

14. The invention according to claim 1 and said first wheel having no more than sixteen spoke means.

15. The invention according to claim 1 and said flange each supporting no more than eight spoke means.

16. The invention according to claim 1 and the cross-sections of the shaft portions and the apertures having a diameter of approximately 2 mm.

17. A bicycle wheel comprising:

a hub structure;

a plurality of spokes extending generally radially outwardly from said hub structure; and a rim structure supporting a tire;

said rim structure having a plurality of apertures therein, each receiving therein a respective spoke;

each of said spokes having a head portion radially outward of the rim structure, said head portion preventing the spoke from being withdrawn radially inwardly from the rim structure;

said spoke each further comprising a shaft portion formed integral with the head portion and extending radially inwardly therefrom through the aperture;

said hub structure including a flange portion supported thereon having flange apertures therein, each spoke shaft extending through a respective flange aperture;

each spoke shaft portion having a radially inward end portion;

a plurality of adjustable securement structures engaging said flange portion, each of said securement structures operatively engaging a respective radially inward end portion of a respective spoke and retaining said spoke against radially outward movement away from said flange portion, said spoke each extending substantially straight from said rim to the respective adjustable securement structure; and a sprocket structure adapted to coact with a chain and receive rotary motion from said chain, said sprocket structure being operatively associated with said hub structure so that rotary motion of said sprocket structure is imparted to said hub structure, causing said wheel to rotate;

said hub structure having opposing lateral ends, one of said ends engaging the sprocket structure, and the other of said ends supporting the flange portion;

a second flange portion connected with the end of the hub structure engaging the sprocket structure and having therein a plurality of flange openings therein;

a group of spoke structures associated with said second flange portion, said spoke structures each comprising:
   a head portion radially outward of the rim structure;
   a shaft formed integral with said head portion and extending substantially straight and generally inwardly of the wheel therefrom and through a respective flange opening; and
   an inward end portion connected with said shaft and engaging an adjustable securement structure engaging said second flange and securing said end portion against radially outward movement from said second flange portion;
   some of said group of spoke structures being angularly swept clockwise relative to said wheel, and the other spoke structures of said group being angularly swept counterclockwise relative to said wheel;
   each of the spokes associated with the first flange portion extending outwardly of the hub structure in a respective plane in which the axis of rotation of the wheel lies.

18. The invention according to claim 17 and said flange being configured so that said adjustable securement structures are positioned radially outward of said sprocket structure.

19. The invention according to claim 18 and said adjustable securement means each comprising a nipple threadingly secured on a thread means on the associated spoke end portion radially inwardly of the flange portion, said first flange portion including a conical concave nipple engagement surface portion providing a surface engaging the nipples substantial perpendicular to the spoke shafts.

20. The invention according to claim 18 and said second flange portion having a generally circular peripheral portion supported on a plurality of leg portions, said peripheral portion and said leg portions defining spaces therebetween in said second flange portion;

said adjustable securement structures being supported in said spaces.

21. The invention according to claim 18 and said spoke shaft portions, said spoke structure shafts, and said rim apertures being generally circular in cross-section and approximately 2 mm in diameter.

\* \* \* \* \*